3,216,986
POLYMER DEASHING WITH ALKANOLS
AND HCl
Robert Joseph Fritz and Arthur Homer Neal, Baton Rouge, La., assignors to Esso Research and Engineering Company, a corporation of Delaware
Filed Dec. 22, 1960, Ser. No. 77,754
6 Claims. (Cl. 260—93.7)

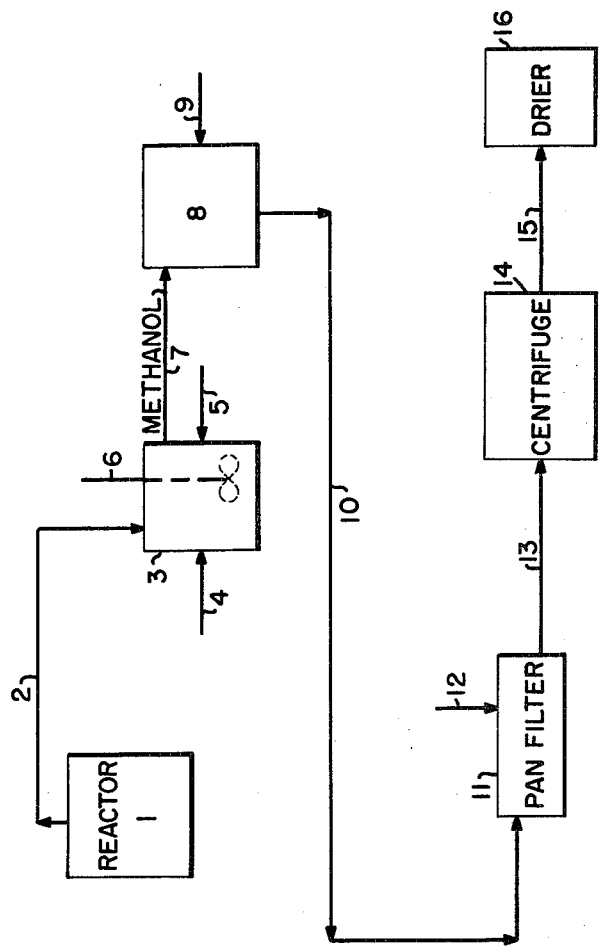

This invention relates to an improved method of removing ash from low pressure hydrocarbon polymers. More particularly, it relates to a process of this nature employing controlled amounts of both a lower alkanol and HCl.

The low pressure polymerization and copolymerization of alpha olefins and diolefins with catalyst systems made up of a partially reduced, heavy transition metal halide and a reducing metal-containing compound to high density, often isotactic, high molecular weight, solid, relatively linear products have been assuming ever increasing importance and are now well known. One of the problems in these low pressure polymers is the ash content caused principally by the catalyst systems utilized. The potential ash content varies depending upon the catalyst efficiency obtained in the polymerization but generally ranges from about 0.5 to 3.0 weight percent as determined by a fusion technique (dry ash). It has been observed that polymers with ash contents greater than about 0.05 weight percent discolor badly during processing and tend to corrode the metals commonly used in processing equipment. For this reason reduction of the ash content to less than 0.05 weight percent is essential in order to produce a commercially desirable product.

Accordingly, various reagents and treatments have been proposed for removing catalyst ash. These reagents, many of which are costly in nature, and the special treatments required, increase the cost of the operation considerably. In many cases too, the residual ash content is still excessively high.

This invention provides an improved integrated method of removing ash from the polymers. The method comprises treating a slurry reaction mixture of a solid $C_2$—$C_3$ alpha olefin low pressure polymer prepared with a catalyst system of a transition metal halide with an aluminum alkyl compound in a hydrocarbon diluent with controlled amounts of both a lower alkanol and HCl. The HCl and alkanol are preferably added substantially simultaneously to the slurry reaction mixture. Additional polymer precipitation from the aromatic diluent is obtained by a subsequent addition of more lower alkanol.

It is indeed surprising that, by the process of this invention, the use of these inexpensive reagents enables the ash content to be diminished to the low levels obtained. Typically ash contents of less than 100 p.p.m by weight are gotten by the process claimed.

For the purpose of convenience, details of the low pressure catalytic process particularly for polypropylene are presented below, although it should be realized that these by themselves constitute no part of this invention. The process is generally described in the literature, e.g., see U.K. Patent 810,023, and "Scientific American," September 1957, pages 98 et seq.

In that process the polymers are prepared by polymerizing the monomer with the aid of certain polymerization catalysts. The catalysts are solid, insoluble reaction products obtained by partially reducing a heavy metal compound usually the halide of a Group IV–B, V–B VI–B metal of the Periodic System, such as vanadium tetrachloride, or a titanium halide, e.g., $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding generally to $TiCl_3 \cdot 1/3$ $AlCl_3$, thus containing co-crystallized $AlCl_3$. (For further details see U.S. Patents 3,128,252 and 3,032,513.) The product is then activated with an aluminum alkyl compound corresponding to the formula $RR'ALX$. In this formula, R, R' and X preferably are alkyl groups of 2 to 8 carbon atoms, although X may alternatively be hydrogen or a halogen, notably chlorine. Typical examples of the aluminum alkyl compounds are aluminum triethyl, ethyl aluminum sesquichloride, aluminum triisobutyl, etc.

The monomers are then contacted with the resulting catalyst in the presence of inert hydrocarbon solvents such as benzene, toluene, xylene, propane, butane, isopentane, 250–300° F. naphtha or alkylate, 300–350° F. naphtha or alkylate, hexane, heptane, octane, and Varnish Makers' and Painters' naphtha. Aromatics are preferred. The polymerization is conveniently effected at temperatures of about 0° to 100° C. and pressures ranging from about 0 to 500 p.s.i.g, usually 0 to 100 p.s.i.g. The catalyst concentration in the polymerization zone is preferably in the range of about 0.02–0.20 wt. percent based on total liquid and the polymer product concentration in the polymerization zone is preferably kept between about 8 and 15% based on total contents so as to allow easy handling of the polymerized mixture. The proper polymer concentration can be obtained by having enough of the inert diluent present or by stopping the polymerization short of 100% conversion.

It is to be understood that the term "low pressure" polymer as used herein connotes material prepared in the indicated manner.

As stated previously, this application is particularly suited for the treatment of $C_2$ and $C_3$ alpha olefin low pressure solid polymers and copolymers.

The lower alkanols employed therein are $C_1$ to $C_4$ alcohols, e.g., methanol, ethanol, propanols and butanols. The alkanol is utilized in an amount of from 0.5 to 5.0 wt. per cent on diluent in the deashing step. Excessive amounts of alkanol in this step actually results in larger amounts of the ash being retained in the polymer. The water content of the alkanol is less than 1%.

The HCl is utilized in an amount of from 1 to 5 mols/mol catalyst metals and is anhydrous. It is the HCl that exhibits selective activity for removing the aluminum residues. As stated previously, the HCl and alkanol are added simultaneously, i.e., preferably at the same point or location in the treating vessel. This results in both improved deashing, minimal corrosion problems, and no alkylation of the diluent. The temperature of the HCl·alkanol treatment is in the range of 140° F. to 190° F. with a contact time of 2 to 15 minutes preferred.

Subsequent to the deashing treatment, additional alkanol can be, and preferably is, added to the reaction mixture to precipitate additional quantities of non-crystalline polymer. The amount of alkanol added in this precipitation step is conveniently in the range of from 5 to 35% based on weight of diluent. It is also desirable to keep the water content below 1% in the alcohol in this step.

This invention will be better understood by reference to the flow diagram and examples.

In the drawing, 1 represents a reactor containing a reaction mixture of polypropylene and xylene, the polymer having been prepared with a catalyst system of an aluminum reduced titanium tetrachloride activated with aluminum triethyl. This system overflows through line 2 into deashing vessel 3. Into this system at 170° F. are injected from lines 4 and 5 HCl and methanol. The HCl is utilized in an amount of 2½ moles per mole of aluminum and titanium in the catalyst. The methanol is utilized in an amount of 2 weight or volume percent based on the xylene. The mixture is agitated by agitator 6 for 10 minutes. Then the system is withdrawn through line 7 into rejection vessel 8. Here, additional methanol is added through line 9 to precipitate more polymer, i.e., about 20 weight percent based on the xylene. The resultant slurry mixture is withdrawn through line 10 and worked up in the conventional manner. It is fed into pan filter 11 where the precipitate is additionally washed with more methanol and xylenes from line 12. The slurry is then passed through line 13 through centrifuge 14 for removal of diluent and additional washing if need be. The product is then withdrawn through line 15 to drier 16 where it is finally dried.

The final product has an ash residue of <100 p.p.m.

*Example 1*

The effect of simultaneous addition of HCl and alkanol is shown as follows. In experiment A, 1.5 wt. percent of methanol and 2 m./m. HCl are added to the reactor slurry in the deashing vessel followed by 20% methanol in the rejection step as taught in this invention. In controlled experiment B, only 1.5 wt. percent methanol is added in the deashing step and 20% methanol and 2 m./m. HCl are added in the rejection step. The results are as follows:

| Experiment | Deashing Vessel Additives | Precipitation Vessel Additives | Polymer Ash, p.p.m. Al |
|---|---|---|---|
| A | HCl+MeOH | MeOH | 15 |
| B | MeOH | HCl+MeOH | 38 |

These results show that more than twice as much aluminum ash was retained in the control as in the claimed process.

*Example 2*

Various acids in different concentrations were employed in the deashing of a low pressure polypropylene prepared with an aluminum reduced TiCl$_4$-aluminum triethyl catalyst with an aluminum/titanium ratio of 2:1 in a xylene diluent. The results of the tests are tabulated below:

| Acid | Concentration, Mols/Mol Metals | Polymer Ash Al, p.p.m. |
|---|---|---|
| Halide: | | |
| Hydrochloric | 2.3 | 49 |
| Hydrobromic | 2.3 | 87 |
| Hydrofluoric | 2.3 | >200 |
| Other Inorganic: | | |
| Sulfuric | 2.3 | 70 |
| Phosphoric | 2.3 | 98 |
| Organic: | | |
| Trichloroacetic | 2.3 | 75 |
| Acetic | 6.0 | 93 |
| No Acid: | | |
| Methanol only | | >200 |

These results demonstrate the superiority of HCl as compared to other acids in lowering aluminum ash residue.

If desired, residual corrosion problems from the use of HCl can be eliminated by the addition of sodium methylate or other base to the second stage alkanol addition.

The advantages of this invention will be apparent to those skilled in the art. An improved, economical, readily controllable, integrated process is provided for reducing the ash content of the indicated polymers.

It is to be understood that this invention is not limited to the specific examples which have been offered merely as illustrations and that modifications may be made without departing from the spirit of the invention.

What is claimed is:

1. In the low-pressure process for preparing a solid polymer from a $C_2$–$C_3$ alpha olefin in the presence of a hydrocarbon diluent and a catalyst system of Group IV to VI–B transition metal halide and an aluminum alkyl compound, the improved method of removing ash from the polymer which comprises contacting the polymer slurry reaction mixture at a temperature in the range of about 140–190° F. with both methanol and anhydrous HCl, the methanol being utilized in an amount of about 1.5 wt. percent on diluent and containing less than 1% water, and the HCl being utilized in an amount of about 2 mol/mol catalyst metals, and further contacting the HCl-methanol treated reaction mixture with additional methanol in an amount of about 20 wt. percent based on diluent to further precipitate solid polymer.

2. In the low pressure process for preparing a solid polymer from a $C_2$–$C_3$ alpha olefin in the presence of a hydrocarbon diluent and a catalyst system of a titanium halide and an aluminum alkyl compound, the improved method of removing ash from the polymer which comprises simultaneously contacting the polymer slurry reaction mixture at the same location in the contacting step with both a lower alkanol and anhydrous HCl at a temperature of from 140°–190° F. for from 2–15 minutes, the alkanol being utilized in an amount of from 0.5 to 5 wt. percent on diluent and containing less than 1% water, the HCl being utilized in an amount of from 1 to 5 mols/mol catalyst metals and treating the HCl-alkanol treated reaction mixture with additional lower alkanol in an amount of from 5–35 wt. percent based on diluent to further precipitate solid polymer.

3. In the low pressure process for preparing solid polypropylene in the presence of a hydrocarbon diluent and a catalyst system made up of a titanium halide and an aluminum alkyl compound, the improved method of removing ash from the polypropylene which comprises simultaneously contacting the polymer slurry reaction mixture at the same location in the contacting step with both a lower alkanol and anhydrous HCl at a temperature of from 140°–190° F. for from 2–15 minutes, the alkanol being utilized in an amount of from 0.5 to 5 wt. percent on diluent and containing less than 1% water, the HCl being utilized in an amount of from 1 to 5 mols/mol catalyst metals and treating the HCl-alkanol treated reaction mixture with additional lower alkanol in an amount of from 5–35 wt. percent based on diluent to further precipitate solid polymer.

4. In the low pressure process for preparing a solid polypropylene polymer in the presence of a hydrocarbon diluent and a catalyst system made of an aluminum reduced titanium chloride activated with aluminum triethyl, the improved method of removing ash from the polypropylene which comprises simultaneously contacting the polymer slurry reaction mixture at the same location in the contacting step with both a lower alkanol and anhydrous HCl at a temperature of from 140°–190° F. for from 2–15 minutes, the alkanol being utilized in an amount of from 0.5 to 5 wt. percent on diluent and containing less than 1% water, the HCl being utilized in an amount of from 1 to 5 mols/mol catalyst metals and treating the HCl-alkanol treated rection mixture with additional lower alkanol in an amount of from 5–35 wt. percent based on diluent to further precipitate solid polymer.

5. In the low pressure process for preparing a solid polypropylene polymer in the presence of an aromatic diluent and a catalyst system made up of an aluminum reduced titanium chloride activated with aluminum triethyl, the improved method of removing ash from the polypropylene which comprises simultaneously contacting the polymer slurry reaction mixture at the same location in the contacting step with a lower alkanol and anhydrous HCl at a temperature of from 140°–190° F. for from 2–15 minutes, the alkanol being utilized in an amount of from 0.5 to 5 wt. percent on diluent and containing less than 1% water, the HCl being utilized in an amount of from 1 to 5 mols/mol catalyst metals and treating the HCl-alkanol treated reaction mixture with additional lower alkanol in an amount of from 5–15 wt. percent based on diluent to further precipitate solid polymer.

6. In the low pressure process for preparing a solid polymer from a $C_2$–$C_3$ alpha olefin in the presence of a hydrocarbon diluent and a catalyst system of a titanium halide and an aluminum alkyl compound, the improved method of removing ash from the polymer which comprises simultaneously contacting the polymer slurry reaction mixture at the same location in the contacting step with both a lower alkanol and anhydrous HCl at a temperature of from 140°–190° F. for from 2–15 minutes, the alkanol being utilized in an amount of from 0.5 to 5 wt. percent on diluent and containing less than 1% water, the HCl being utilized in an amount of from 1 to 5 mols/mol catalyst metals and treating the HCl-alkanol treated reaction mixture with methanol in an amount of from 5–35 wt. percent based on diluent to further precipitate solid polymer.

References Cited by the Examiner
UNITED STATES PATENTS

| | | | |
|---|---|---|---|
| 2,899,413 | 8/59 | Hagemeyer et al. | 260—88.2 |
| 2,938,021 | 5/60 | Geiser et al. | 260—94.9 |
| 3,058,971 | 10/62 | Miller et al. | 260—94.3 |
| 3,066,130 | 11/62 | Grundmann | 260—94.9 |
| 3,082,199 | 5/63 | Lattenkamp et al. | 260—94.9 |

JOSEPH L. SCHOFER, *Primary Examiner.*

M. LIEBMAN, *Examiner.*